(12) United States Patent
Al-Huwaider

(10) Patent No.: US 7,891,183 B2
(45) Date of Patent: Feb. 22, 2011

(54) WAVE-BASED POWER GENERATION SYSTEM

(75) Inventor: Mustafa Ali Al-Huwaider, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 591 days.

(21) Appl. No.: 12/068,720

(22) Filed: Feb. 11, 2008

(65) Prior Publication Data

US 2009/0200806 A1 Aug. 13, 2009

(51) Int. Cl.
*F03C 1/00* (2006.01)
(52) U.S. Cl. ............................... 60/498; 60/497; 60/504
(58) Field of Classification Search ............ 60/495–507
See application file for complete search history.

(56) References Cited

U.S. PATENT DOCUMENTS

| | | | |
|---|---|---|---|
| 3,965,365 A | 6/1976 | Parr | |
| 4,108,578 A | 8/1978 | Corey | |
| 4,408,455 A | 10/1983 | Montgomery | |
| 4,418,286 A | 11/1983 | Scott | |
| 4,438,343 A * | 3/1984 | Marken | 290/53 |
| 4,598,547 A * | 7/1986 | Danihel | 60/507 |
| 4,627,240 A | 12/1986 | Holmes | |
| 4,672,222 A | 6/1987 | Ames | |
| 4,803,839 A | 2/1989 | Russo, III | |
| 4,872,309 A * | 10/1989 | Jaenichen, Sr. | 60/497 |
| 5,424,582 A | 6/1995 | Trepl, II et al. | |
| 6,561,856 B1 | 5/2003 | Gorshkov | |
| 6,711,897 B2 | 3/2004 | Lee | |
| 6,781,253 B2 | 8/2004 | Newman | |
| 7,043,904 B2 | 5/2006 | Newman | |
| 2005/0285402 A1 | 12/2005 | Ames | |
| 2006/0273594 A1 | 12/2006 | Gehring | |

FOREIGN PATENT DOCUMENTS

| | | |
|---|---|---|
| CN | 1090910 | 8/1994 |
| DE | 4143011 C1 | 4/1993 |

* cited by examiner

*Primary Examiner*—Hoang M Nguyen
(74) *Attorney, Agent, or Firm*—Richard C. Litman

(57) ABSTRACT

The wave-based power generation system has a buoy or float retained by a cable that enters an underwater power generating station. The cable enters the station housing through an inverted U-tube having upturned inlet and outlet ports, which prevent water from entering the housing. The buoy cable passes over an inlet pulley assembly disposed within the U-tube and has its free end secured to a take-up reel or sheave. A driver pulley is mounted on a shaft coaxial with the take-up reel shaft, and is constrained to unidirectional rotation. Rotation of the driver pulley is coupled to a mainspring pulley and a timing pulley through an idler pulley. A mainspring is compressed by rotation of the mainspring pulley until a cam wheel coaxial with the timing wheel releases a brake, causing the mainspring to expand and rotate a generator shaft to produce electricity.

20 Claims, 4 Drawing Sheets

WAVE-BASED POWER GENERATION SYSTEM

BACKGROUND OF THE INVENTION

1. Field of the Invention

The present invention relates to power generating systems, and particularly to a wave-based power generation system for generating electrical power from the motion of waves in a body of water.

2. Description of the Related Art

Due to the limitations of non-renewable energy sources, such as oil and coal, as well as the negative environmental effects of such energy sources, it is desirable to provide alternative energy conversion and transfer systems that are based on renewable sources of power with minimal effects on the environment. In recent years, systems for the conversion of the energy of ocean-based waves into electrical power have been of interest. However, such systems typically require the construction of large and complex structures near the ocean or on ocean-mounted platforms. Not only are such structures difficult and costly to build, but their large-scale frameworks, built or deployed on the ocean, are vulnerable to storm damage and are costly to maintain.

It would be desirable to provide a system that allows for the transfer and conversion of usable energy from ocean waves, that does not require large scale construction, and that includes mechanical elements that are not vulnerable to high winds, storm currents and similar extreme environmental conditions, with the delicate mechanical parts being shielded from surface conditions.

Thus, a wave-based power generation system solving the aforementioned problems is desired.

SUMMARY OF THE INVENTION

The wave-based power generation system has a buoy or float retained by a cable that enters an underwater power generating station. The cable enters the station housing through an inverted U-tube having upturned inlet and outlet ports, which prevent water from entering the housing. The buoy cable passes over an inlet pulley assembly disposed within the U-tube and has its free end secured to a take-up reel or sheave. A driver pulley is mounted on a shaft coaxial with the take-up reel shaft, and is constrained to unidirectional rotation. Rotation of the driver pulley is coupled to a mainspring pulley and a timing pulley through an idler pulley. A mainspring is compressed by rotation of the mainspring pulley until a cam wheel coaxial with the timing wheel releases a brake, causing the mainspring to expand and rotate a generator shaft to produce electricity.

Unidirectional rotation of the driver pulley is provided so that only upward motion of the buoy produces electricity. A counterpoise formed by a reel or drum having an internal spiral spring biases the take-up reel to return to an equilibrium position during downward motion of the buoy. The timing pulley has a large diameter relative to the mainspring pulley in order to allow the mainspring (also a spiral spring) to store enough potential energy to generate sufficient current to charge a storage battery or do other useful work. The brake assembly includes a spring-biased piston journaled through roller bearings and having a first roller at one end that bears against the perimeter of the cam wheel, and a second roller at the opposite end that bears against vanes extending from the mainspring pulley shaft when the first roller is riding high on the cam, but is withdrawn from contact with the vanes when the first roller slides down the shoulder of the cam. The wave-base power generation system can be used to generate electricity from the motion of waves in the ocean, in seas, in lakes, in gulfs, or in other bodies of water where winds, gravitational attraction of the moon, currents, and thermal gradients may generate waves.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
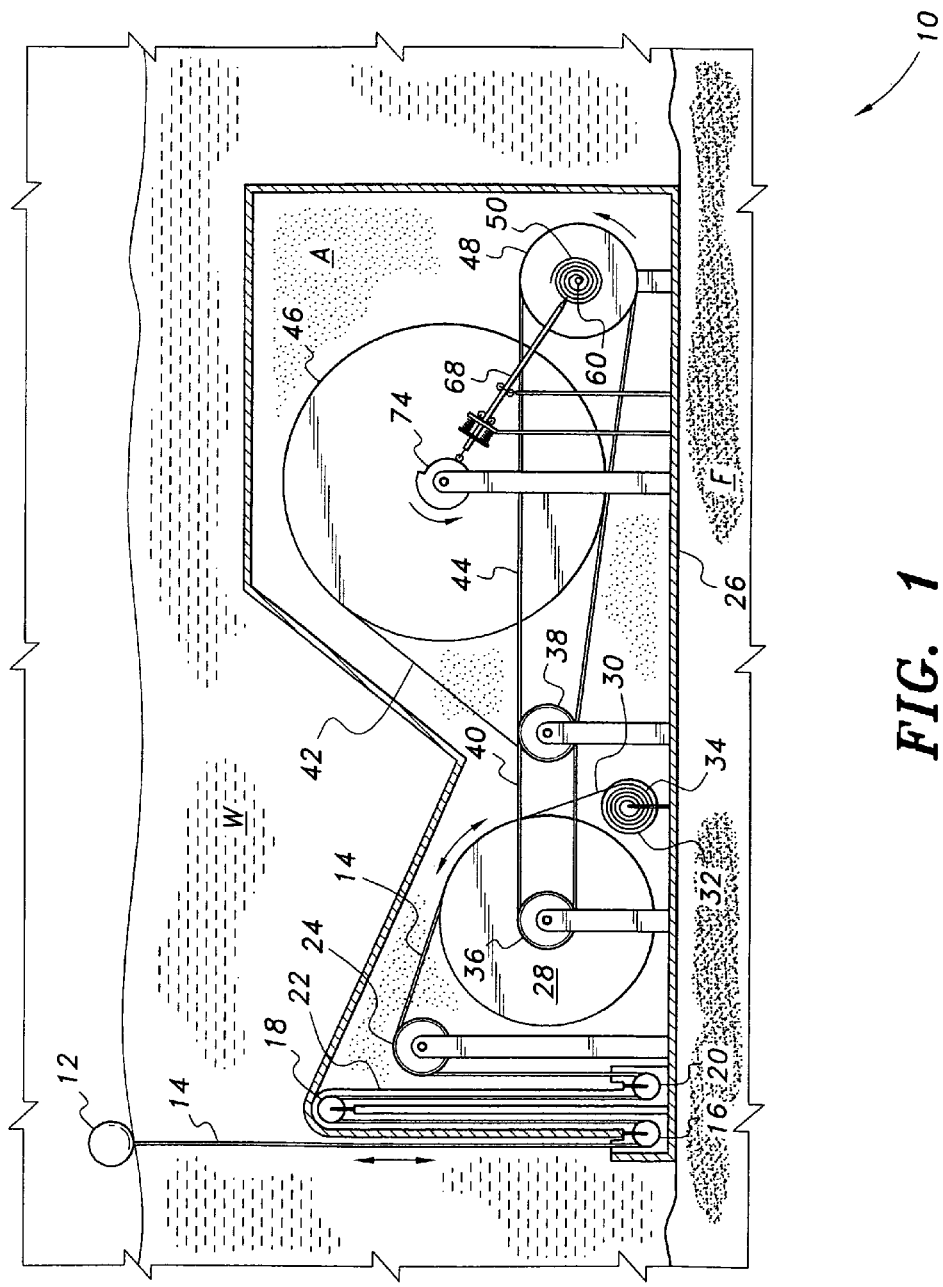
FIG. 1 is an environmental side view in partial section of a wave-based power generation system according to the present invention.

The present invention relates to a wave-based power generation system, designated generally as 10 in the drawings. Referring to FIG. 1, the system 10 includes a buoy or float 12 tethered by a cable 14 or other elongated flexible member resistant to corrosion, such as a string, a rope, a polyethylene cable, one or more strands of monofilament fishing line, a stainless steel, aluminum, or galvanized cable, etc. The cable 14 enters the housing 26 of an underwater power generation system through an inlet defined by an inverted U-tube 22 having upturned inlet and outlet ports, the housing defining a power generation chamber. The U-tube 22 provides for equilibration between the water pressure exerted by water W and air pressure exerted by air A within the housing and tends to keep the machinery disposed within housing 26 dry.

Cable 14 is routed through an inlet pulley assembly 15, which includes pulleys 16, 18, and 20, disposed within the U-tube, and pulley 24, mounted on a bearing or other support. The free end of cable 14 is attached to take-up reel 28, which is rotatably mounted on a shaft supported by a stanchion. Take-up reel 28 is a double groove sheave, having cable 14 wound clockwise in one of the grooves, and cable 30 wound counterclockwise in the adjacent groove. Cable 30 is also fixed to reel 28 at one end, and has its opposite end fixed to counterpoise reel or drum 32. Counterpoise reel 32 has an internal spiral spring 34 mounted therein.

When a wave raises buoy 12, cable 14 causes counterclockwise rotation of take-up reel 28 and corresponding winding of spring 34. When the wave falls, tension is released from spring 34, causing spring 34 to unwind, with resulting clockwise rotation of take-up reel 28. The spiral spring 34 is a weak spring having a relatively low spring constant so that take-up reel 28 is responsive to even small motions of the waves. The counterpoise reel 32 biases take-up reel 28 to an equilibrium position in the absence of waves, and maintains proper tension on cables 14 and 30 when the waves are falling.

A driver pulley 36 is mounted on a shaft coaxial with the take-up reel 28, but is constrained to unidirectional rotation, i.e., driver pulley 36 rotates only when take-up reel 28 rotates counterclockwise. This constraint to unidirectional rotation may be accomplished in any conventional manner. For example, driver pulley 36 may be mounted for rotation on a shaft that is coupled to the take-up reel shaft by a magnetic clutch controlled by optical sensors to ensure rotation only when take-up reel 28 rotates counterclockwise. Alternatively, driver pulley 36 may be mounted on a shaft coupled to the take-up reel 28 by a clutch, with the driver pulley 36 having a ratchet wheel mounted on its shaft that engages a pawl to constrain rotation to counterclockwise rotation with take-up reel 28. Constraining rotation of driver pulley 36 to counterclockwise rotation means that the system 10 derives power only when the buoy 12 rises with the rising action of the waves.

Driver pulley 36 is coupled to an idler pulley 38 by belt 40, the idler pulley also being supported on a stanchion. The idler pulley 38 is a triple groove sheave. A second belt 42, riding in the second groove, couples idler pulley 38 to a large diameter timing pulley 46. A third belt 44, riding in the third groove, couples idler pulley 38 to a mainspring pulley 48.

Figure 2:
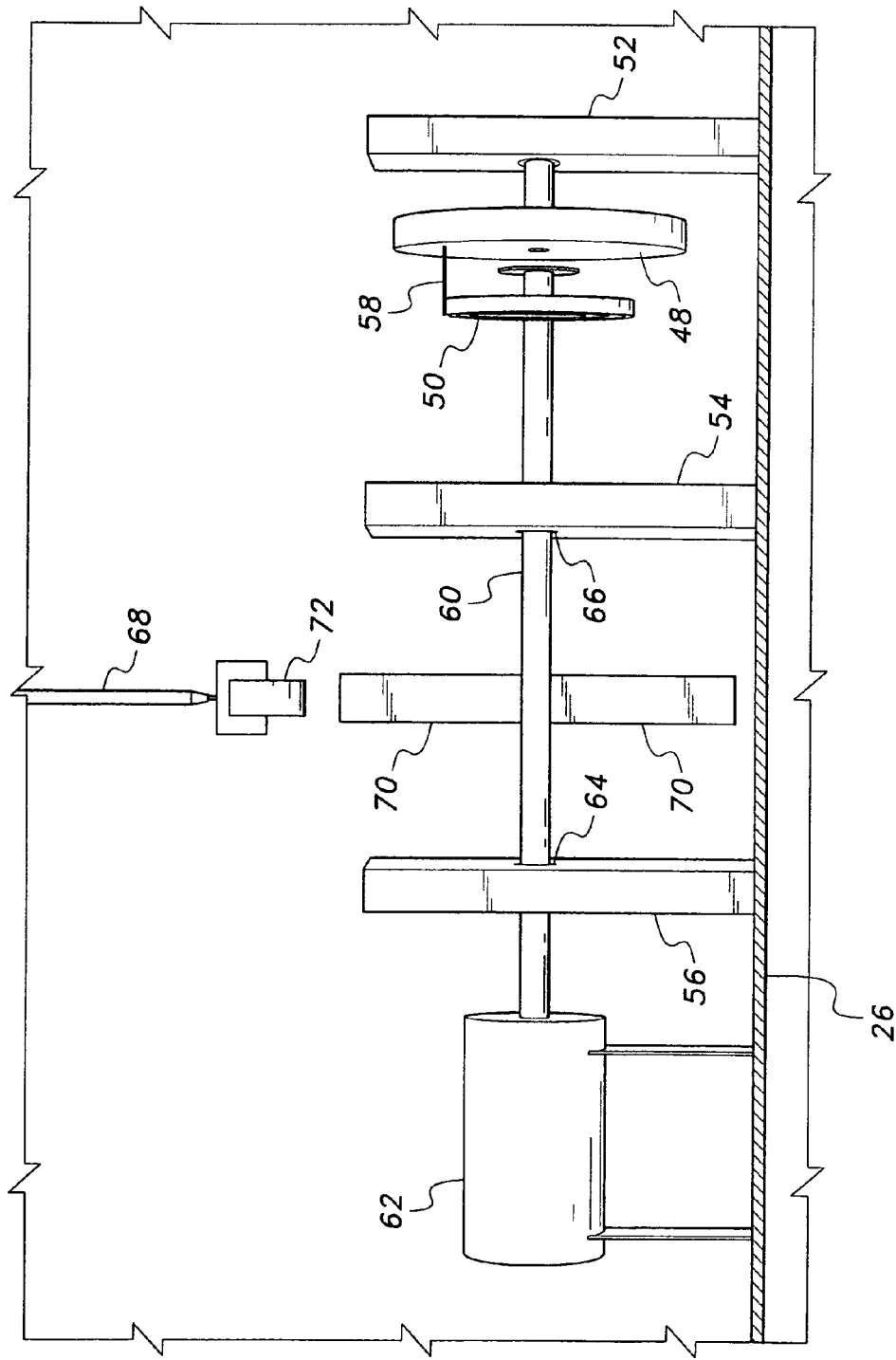
FIG. 2 is a partial front view of the wave-based power generation system according to the present invention, showing connection of the mainspring to the electrical generator.

As shown in FIG. 2, mainspring pulley 48 is rotatably mounted on a stanchion. A shaft 60 that rotates an armature in generator 62 to produce electricity is aligned coaxially with the mainspring pulley shaft. Shaft 60 is supported by stanchions 52, 54, and 56 and journaled through bearings 64, 66. A spiral mainspring 50 has one end fixed to shaft 60 and a second end coupled to mainspring pulley 48 by rod 58. Shaft 60 has a pair of vanes or plates 70 extending radially therefrom that cooperate with a brake assembly 71, shown in more detail in FIGS. 3A and 3B The brake assembly 71 includes a cam wheel 74 mounted coaxially on the same shaft as timing pulley 46. Cam wheel 74 has a generally circular shape, but with a sharp shoulder that defines an arc 76 of progressively increasing diameter to the high side of the cam wheel 74. The arc 76 may extend between about 90° and 120°. The brake assembly also includes a cam follower, which is a spring-biased piston 68 mounted on posts 78 and journaled through roller bearings 80 attached to the posts 78. Piston 68 has a first roller 82 at its upper end that bears against cam wheel 74 and a second roller 72 at its opposite lower end that bears against vanes 70. A compression spring 84 is mounted between two discs 86 and 88. Disc 86 is fixed to one of the posts 78, and disc 88 is fixed to the piston 68.

Figure 3A:
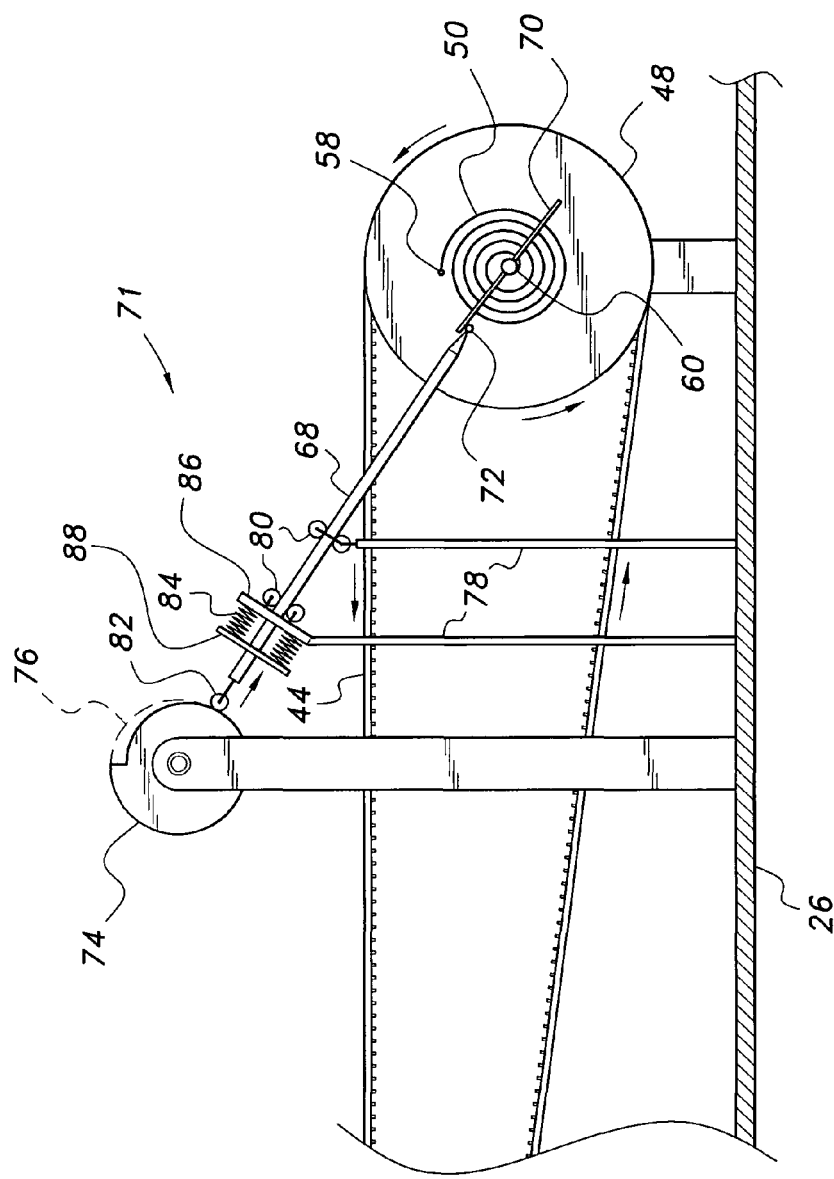
FIG. 3A is a diagrammatic partial side view of the wave-based power generation system according to the present invention, shown with the brake applied to the mainspring.

As shown in FIG. 3A, when roller 82 bears against the high side (larger radius) of cam wheel 74, piston 68 slides downward, compressing spring 84 and causing roller 72 to bear against the side of one of the vanes 70, precluding rotation of shaft 60. During this period, shaft 60 is fixed so that rotation of mainspring pulley 48 causes winding of the mainspring 50 due to coupling rod 58, storing potential energy in the mainspring 50.

Figure 3B:
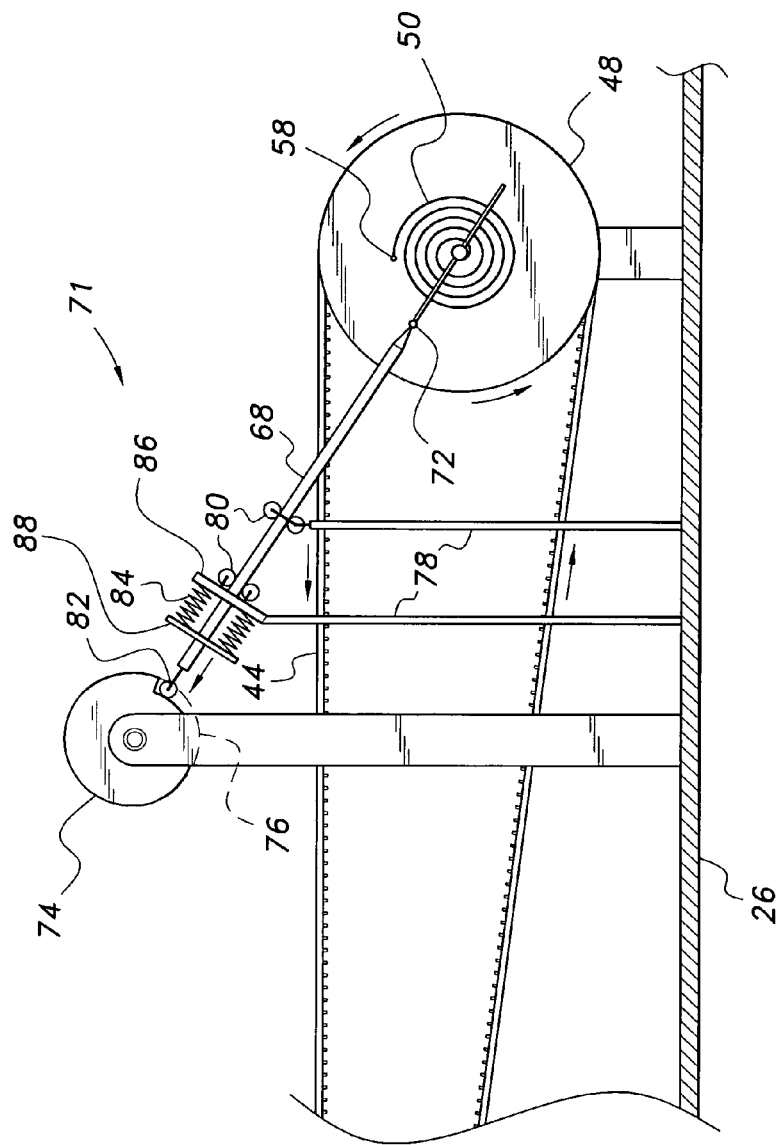
FIG. 3B is a diagrammatic partial side view of the wave-based power generation system according to the present invention, shown with the brake released.

As shown in FIG. 3B, when cam wheel 74 rotates counterclockwise until the shoulder of the cam wheel 74 is opposite piston 68, compression spring 84 expands, driving roller 82 down the sharp edge of the shoulder to bear against the low side of the cam wheel 74 and sliding piston 68 upward so that roller 72 retracts and no longer bears against the side of the vane 70. Shaft 60 is then free to rotate, and mainspring 50 unwinds, converting the potential energy stored in the mainspring 50 to electricity produced by generator 62, which may be used to charge a storage battery or to perform other useful work. Continued rotation of cam wheel 74 causes roller 82 to ride up the arc 76 to gradually compress spring 84 and interpose roller 72 into the path of the vanes 70, applying a brake to preclude rotation of shaft 60 and rewind mainspring 5b.

The duty cycle of the generator 62 is regulated by the timing pulley 46. Timing pulley 46 has a large diameter relative to the mainspring pulley 50 in order to allow the mainspring 50 to store enough potential energy to generate sufficient current to charge a storage battery or do other useful work. The mainspring pulley 50 may, for example, cycle through two complete revolutions for each complete revolution of the timing pulley 46.

The housing 16 for the underwater power generation system may be fixed to floor of the body of water, and several units may be connected in parallel using a rectifier, which may result in maximum power generation. Alternatively, the entire housing 16 may be floating if lightweight components are used, which may provide for easier maintenance than the fixed facility, but may be heavier on the waves. If desired, the buoy or float 12 may be tethered to shore by a rubber cable, or other flexible, resilient line, so that the buoy 12 does not drift or get carried too far away from the area above the housing inlet.

The wave-based power generation system can be used to generate electricity from the motion of waves in the ocean, in seas, in lakes, in gulfs, or in other bodies of water where winds, gravitational attraction of the moon, currents, and thermal gradients may generate waves, providing an economical alternative source of power that takes advantage of renewable natural phenomena.

It is to be understood that the present invention is not limited to the embodiments described above, but encompasses any and all embodiments within the scope of the following claims.

I claim:

1. A wave-based power generation system, comprising:
a float adapted for floating on a body of water;
a housing adapted for being fixed to a floor of the body of water, the housing defining an underwater power generation chamber having an inlet passage;
an inlet pulley assembly disposed in the inlet passage;
a take-up reel disposed in the power generation chamber;
a cable having a first end attached to the float and a second end attached to the take-up reel, the cable passing over the inlet pulley assembly and through the inlet passage;
a driver pulley coupled for rotation with the take-up reel, the driver pulley being constrained to unidirectional rotation;
a timing pulley driven by the driver pulley, the timing pulley being disposed within the power generation chamber;
a mainspring pulley driven by the driver pulley, the mainspring pulley being disposed within the power generation chamber;
an electrical generator having a rotor shaft extending therefrom, the electrical generator and rotor shaft being disposed within the power generation chamber;
a spiral mainspring mounted on the rotor shaft and coupled to the mainspring pulley; and
a brake assembly extending between the timing pulley and the generator shaft, the timing pulley moving the brake assembly between a braking position precluding rotation of the rotor shaft while the mainspring pulley winds the mainspring to store potential energy when waves raise the float, and a release position permitting rapid unwinding of the mainspring and rotation of the rotor shaft to generate electricity.

2. The wave-based power generation system according to claim 1, wherein said inlet passage comprises an inverted U-shaped tube having and upwardly turned inlet and an upwardly turned outlet, the U-shaped tube equalizing water pressure from the body of water with air pressure inside the power generation chamber to keep the power generation chamber dry.

3. The wave-based power generation system according to claim 1, further comprising a counterpoise connected to the take-up reel, the take-up reel comprising a double groove sheave, the counterpoise having a counterpoise reel, a spiral counterpoise spring disposed within the counterpoise reel, and a cable extending between the counterpoise reel and one of the grooves of the take-up reel, the counterpoise applying a spring bias to the float cable and to the counterpoise cable when the float falls to properly position the take-up reel.

4. The wave-based power generation system according to claim 3, wherein the counterpoise spiral spring has a low spring constant, the counterpoise spiral spring being weak in order to permit rotation of the take-up reel in response to low level movement of the waves.

5. The wave-based power generation system according to claim 1, further comprising an idler pulley, the idler pulley being a triple groove sheave, and belts connecting the driver pulley with the idler pulley, the timing pulley with the idler pulley, and the mainspring pulley with the idler pulley in the three grooves of the idler pulley, respectively.

6. The wave-based power generation system according to claim 1, wherein said brake assembly comprises:
a cam wheel coaxially mounted for rotation with the timing pulley;
a pair of vanes extending from the rotor shaft; and
a cam follower extending between the cam wheel and the rotor shaft, the cam follower bearing against one of the vanes in the braking position and being withdrawn from contact with the vanes in the release position.

7. The wave-based power generation system according to claim 6, wherein said cam wheel is generally circular, having a periphery forming a sharp shoulder defining an arc of progressively increasing radius extending between about 90° and 120°, and a high side extending about the remaining periphery.

8. The wave-based power generation system according to claim 7, wherein said cam follower comprises:
a piston extending between the cam wheel and the rotor shaft, the piston having an upper end, a lower end, and upper and lower rollers extending from the upper and lower ends, respectively;
a stanchion extending from the housing into the power generation chamber; and
a first disc, a second disc and a compression spring extending between the first and second discs, the first disc being fixed to the piston and the second disc being fixed to the stanchion, the upper piston roller bearing against the periphery of the cam wheel;
wherein the lower piston roller bears against one of the vanes, the compression spring is compressed and the upper piston roller bears against the high side of the cam wheel in the braking position; and
the compression spring expands and the lower roller is withdrawn from contact with the vanes when the upper roller rides down the shoulder and bears against the arc of progressively increasing radius.

9. The wave-based power generation system according to claim 6, wherein said timing pulley has a greater diameter than said mainspring pulley in order to compress said mainspring during multiple waves.

10. The wave-based power generation system according to claim 1, wherein said driver pulley is constrained to counterclockwise rotation, whereby said mainspring is wound only when said float rises.

11. A wave-based power generation system, comprising:
a float adapted for floating on a body of water;
a housing adapted for being fixed to a floor of the body of water, the housing defining an underwater power generation chamber having an inlet passage;
an inlet pulley assembly disposed in the inlet passage;
a take-up reel disposed in the power generation chamber;
a cable having a first end attached to the float and a second end attached to the take-up reel, the cable passing over the inlet pulley assembly and through the inlet passage;
a driver pulley coupled for rotation with the take-up reel, the driver pulley being constrained to unidirectional rotation;
a timing pulley driven by the driver pulley, the timing pulley being disposed within the power generation chamber;
a mainspring pulley driven by the driver pulley, the mainspring pulley being disposed within the power generation chamber;
an electrical generator having a rotor shaft extending therefrom, the electrical generator and rotor shaft being disposed within the power generation chamber;
a spiral mainspring mounted on the rotor shaft and coupled to the mainspring pulley; and
means for precluding rotation of the rotor shaft as the mainspring is being wound and for suddenly releasing the mainspring for rapid unwinding and rotation of the rotor shaft to generate electricity.

12. The wave-based power generation system according to claim 11, wherein said inlet passage comprises an inverted U-shaped tube having and upwardly turned inlet and an upwardly turned outlet, the U-shaped tube equalizing water pressure from the body of water with air pressure inside the power generation chamber to keep the power generation chamber dry.

13. The wave-based power generation system according to claim 11, further comprising a counterpoise connected to the take-up reel, the take-up reel comprising a double groove sheave, the counterpoise having a counterpoise reel, a spiral counterpoise spring disposed within the counterpoise reel, and a cable extending between the counterpoise reel and one of the grooves of the take-up reel, the counterpoise applying a spring bias to the float cable and to the counterpoise cable when the float falls to properly position the take-up reel.

14. The wave-based power generation system according to claim 13, wherein the counterpoise spiral spring has a low spring constant, the counterpoise spiral spring being weak in order to permit rotation of the take-up reel in response to low level movement of the waves.

15. The wave-based power generation system according to claim 11, further comprising an idler pulley, the idler pulley being a triple groove sheave, and belts connecting the driver pulley with the idler pulley, the timing pulley with the idler pulley, and the mainspring pulley with the idler pulley in the three grooves of the idler pulley, respectively.

16. The wave-based power generation system according to claim 11, wherein said means for precluding rotation comprises a brake assembly having:
a cam wheel coaxially mounted for rotation with the timing pulley;
a pair of vanes extending from the rotor shaft; and
a cam follower extending between the cam wheel and the rotor shaft, the cam follower bearing against one of the vanes in the braking position and being withdrawn from contact with the vanes in the release position.

17. The wave-based power generation system according to claim 16, wherein said cam wheel is generally circular, having a periphery forming a sharp shoulder defining an arc of progressively increasing radius extending between about 90° and 120°, and a high side extending about the remaining periphery.

18. The wave-based power generation system according to claim 17, wherein said cam follower comprises:
   a piston extending between the cam wheel and the rotor shaft, the piston having an upper end, a lower end, and upper and lower rollers extending from the upper and lower ends, respectively;
   a stanchion extending from the housing into the power generation chamber; and
   a first disc, a second disc and a compression spring extending between the first and second discs, the first disc being fixed to the piston and the second disc being fixed to the stanchion, the upper piston roller bearing against the periphery of the cam wheel;
   wherein the lower piston roller bears against one of the vanes, the compression spring is compressed and the upper piston roller bears against the high side of the cam wheel in the braking position; and
   the compression spring expands and the lower roller is withdrawn from contact with the vanes when the upper roller rides down the shoulder and bears against the arc of progressively increasing radius.

19. The wave-based power generation system according to claim 16, wherein said timing pulley has a greater diameter than said mainspring pulley in order to compress said mainspring during multiple waves.

20. The wave-based power generation system according to claim 11, wherein said driver pulley is constrained to counterclockwise rotation, whereby said mainspring is wound only when said float rises.

* * * * *